United States Patent [19]

Connelly et al.

[11] Patent Number: 4,745,555
[45] Date of Patent: May 17, 1988

[54] METHOD AND APPARATUS FOR INVENTORY CONTROL TO OPTIMIZE USAGE OF COLORED FABRIC

[75] Inventors: Roland L. Connelly; Robert F. Willis; Jeremy D. Phelan, all of Greensboro; Kathleen A. Nealen, Kernersville, all of N.C.

[73] Assignee: Burlington Industries, Inc., Greensboro, N.C.

[21] Appl. No.: 54,205

[22] Filed: May 26, 1987

Related U.S. Application Data

[63] Continuation of Ser. No. 773,216, Sep. 6, 1985, Pat. No. 4,688,178.

[51] Int. Cl.$^4$ .......................... G01N 21/25; G01J 3/50
[52] U.S. Cl. .................................... 364/470; 364/403; 364/526; 356/426
[58] Field of Search ....................... 364/470, 403, 526; 356/426

[56] References Cited

U.S. PATENT DOCUMENTS

| | | | |
|---|---|---|---|
| 4,411,529 | 10/1983 | Ingalls et al. | 356/404 |
| 4,414,635 | 11/1983 | Gast et al. | 356/405 |
| 4,613,947 | 9/1986 | Suzuka et al. | 364/526 |

OTHER PUBLICATIONS

"From HunterLab . . . New Continuous Textile Shade Monitor TM TSM" pp. 1–6.
"Color Tolerances, Specifications and Shade Sorting" by Aspland et al., *Textile Chemist and Colorist* 18-6, pp. 27–29, (June 1986).
"Modification to the JPC79 Colour-difference Formula" by Clarke et al., *Journal of the Society Dyers and Colourists* 100-4, pp. 128–132, (1984).
"Shade Sorting by the 555 System" by Simon, *American Dyestuff Reporter*, pp. 17–26, (1984).

*Primary Examiner*—Charles E. Atkinson
*Assistant Examiner*—Allen MacDonald
*Attorney, Agent, or Firm*—Nixon & Vanderhye

[57] ABSTRACT

In a data base of inventoried fabric pieces (e.g. rolls) having associated predetermined color parameter value data, a target fabric piece is initially selected having color parameter values which substantially deviate from a nominal center point within the color parameter space. Thereafter, a subset of the inventoried fabric pieces is identified having associated color parameters sufficiently near to those of the identified target piece as to be commonly usable therewith (e.g. in the construction of a garment). The color parameters may include red/green difference (da*), yellow/blue difference (db*) and lightness difference (dL*) values. Those defined points which fall within an ellipsoidal color space volume (having axes dimensioned to correspond to a predetermined acceptable variations in the color parameters within the desired subset and having a center selected so as to cause the color parameter values of the target piece to be located at the outer portion of such an ellipsoidal volume) are selected as a potentially usable subset. The result is an inverted or outside-toward-inside shade grouping selection process (in color space) of the inventoried fabric pieces—rather than vice versa—thus tending always to concentrate the color space values of remaining inventoried fabric pieces.

8 Claims, 2 Drawing Sheets

METHOD AND APPARATUS FOR INVENTORY CONTROL TO OPTIMIZE USAGE OF COLORED FABRIC

This is a continuation of application Ser. No. 773,216, filed Sept. 6, 1985, now U.S. Pat. No. 4,688,178.

This invention is generally directed to a computer-managed inventory control method and apparatus for optimizing the selection of a subset of colored fabric pieces from an existing inventory for common use (e.g. in the construction of a garment).

Garment manufacturers, particularly those using solid shades of fabric (e.g. denim fabrics as in the exemplary embodiment), purchase the fabric from textile manufacturers based upon certain specifications. Included among the specifications are those for color and, in particular, such color parameters typically include the specification of a nominal value for red/green color content, yellow/blue color content and lightness. For each of these nominal color parameter values, a range of acceptable values is typically acceptable (indeed it may be impossible for the textile manufacturer to produce different pieces of fabric having such color parameter values identical to the desired specified nominal values). Accordingly, such garment manufacturers will, at any given time, have in their inventory a collection of rolls of fabric (i.e., "pieces") having various combinations of color parameter values. Individual pieces of fabric may actually be in storage at various inventory locations or in transit to various warehouses or the like as will be apparent.

It is already common practice for such garment manufacturers to have a computer-controlled inventory data base for the various pieces of fabric in current inventory and identifying various characteristics of each piece of fabric including color parameters, date of acquisition, location, etc. Typically a conventional color measuring instrument is used to measure in CIE Lab color space: (1) differential lightness $dL^*$, where positive values represent fabric which is lighter than the nominal standard and negative values represent fabric which is less light or darker than the nominal standard; (2) red/green difference $da^*$, where positive values represent more red content than the nominal standard and negative values represent more green content than the nominal standard; and (3) yellow/blue difference $db^*$, where positive values represent more yellow content than the nominal standard and negative values represent more blue content than in the nominal standard. (Alternative "Hunter Lab" and "CIELab LCH" color spaces are also known and may be used in analogous ways).

When making up a garment from fabric, individual cut pieces coming from one or more fabric rolls fetched from inventory must be assembled together within the finished garment(s)—and must therefore have color parameter values which closely match one another. Typically, the requirements for color parameter matching within the cut pieces to be used for a given garment manufacturing run are considerably more stringent than those set for general acceptability into the inventory of fabric rolls. That is, with respect to the cut pieces going into any particular garment, the acceptable range of color parameter values is more narrow than the overall range of color values deemed acceptable when fabric rolls, bolts or other large pieces of fabric are purchased from a textile manufacturer. Typically, such color matching requirements apply to all three of the $dL^*$, $db^*$ and $da^*$ color parameter variables.

Accordingly, it is typically necessary to pick and choose a particular subset of fabric rolls from among those currently in inventory to provide those which can be commonly used together in making up a given garment manufacturing run. Traditionally, there have been at least two ways of accomplishing such selection.

In a first conventional technique, samples of each fabric roll and inventory are cut off and visually examined and subjectively grouped according to color similarity. A subjective visual determination of an acceptable subgroup of the samples is made and, in turn, the corresponding fabric rolls are then fetched from inventory and used in a garment manufacturing run.

A second conventional technique is more mechanized and is sometimes known as "sorting". In this second conventional technique, the color parameter values for $dL^*$, $db^*$ and $da^*$ are measured (e.g., using conventional commercially available color measuring instruments such as a colorimeter having directly usable numerical outputs or a spectrophotometer having outputs which may be appropriately scaled or otherwise processed) and recorded (e.g., in a computerized data base or the like) for each fabric roll currently in inventory. The computer is then typically programmed so as to group the inventoried rolls of fabric by assigning the same sort code to each piece which has similar color parameter values. This typically results in the fabric pieces having values closest to the nominal or mean value being first selected for use since those blocks are likely to have a larger number of representative rolls of fabric therewithin (e.g., thus making it convenient to make a selection from within that group where a large total fabric length is needed for a given garment manufacturing run). At the same time, fabric rolls having color parameter values which caused them to be placed in groups having values located toward the edges of acceptable color space ranges are less likely to be used—since there are typically fewer rolls included within any given such group.

Viewed from a different perspective, since there are three color parameter variables typically of interest, they may be thought of as defining a three dimensional color space. Any given fabric roll currently in inventory will thus correspond to some predetermined or defined point within color space. For convenience, the origin of such a three dimensional color space may be thought of as the specified nominal or acceptable mean values for the color parameters (i.e., where the differential color parameters $dL^*=0$, $da^*=0$ and $da^*=0$). Thus, most of the defined points within that color space will be clustered towards the origin with a relatively fewer number of defined points existing toward the outer edges of an acceptable portion of color space. For example, the acceptable portion of color space is typically a right parallelepiped in color space where each of the three color parameters are permitted to deviate by predetermined plus/minus amounts from nominal specified values. A typical prior art sorting system continuously selects the center-most right parallelepiped out of the larger parallelepiped of acceptable inventoried values. Accordingly, fabric rolls with color parameter values corresponding to defined points located towards the edges of acceptable color space values will tend to remain in inventory.

The present invention permits a more efficient usage of fabric rolls held within inventory. It is in some ways similar to the prior sorting system in that each roll of inventoried fabric is still evaluated according to dL*, db and da and such measured color parameter data values are recorded in a computerized data base for each such inventoried roll. However, unlike the prior sorting technique, when selecting a subset of fabric rolls in accordance with this invention for use together (e.g. in garment manufacture), the present invention first identifies a target fabric roll having color parameter values displaced substantially away from the origin in the three dimensional color space of acceptable values (e.g. in the exemplary embodiment the furthest displaced point is first selected as a target). An ellipsoidal volume within color space is then defined such that its boundary includes the selected target point values. (Alternatively, the ellipsoidal volume might be otherwise situated so as to encompass the selected target point. Other acceptable volume shapes such as paradelepipeds might also be similarly positioned about the selected distal target point.)

The axes of the constructed ellipsoidal (or otherwise shaped) volume are dimensioned so as to correspond to the range of color space values which can be acceptably usable together (e.g. in the construction of a single garment). A computer is programmed to then evaluate the color parameters for all other inventoried fabric rolls and to determine whether they fall within the thus defined acceptable volume in color space. The total length of fabric available in such selected subset is then evaluated to see if it is sufficient for the task at hand. If so, then a suitable report is generated identifying the fabric rolls in inventory which are to be fetched and used together for the garment manufacturing run—and the computerized inventory records are appropriately updated so as to remove those rolls from current inventory.

On the other hand, if the thus selected subset of fabric rolls currently in inventory provides insufficient fabric length for the desired manufacturing run, then a new inventory target point, also substantially displaced from the origin in color space of acceptable values (e.g., in the exemplary embodiment the next furthest point from the origin is selected) is identified. A similar acceptable ellipsoidal volume is then constructed with its outer surface passing through the newly identified target point (and still having axes dimensioned so as to correspond to the range of acceptable color parameter values for use in construction of a garment). Similarly, the subset of the existing inventory having defined color space points falling within this ellipsoid is then identified and the total fabric length thus available within this further subset is then evaluated to see if it provides sufficient yardage for the desired garment run. If so, then a suitable report is generated identifying the rolls to be pulled from inventory, to be updated in the computerized inventory data base, etc. If not, then the process is repeated iteratively until sufficient yardage is found for the desired garment manufacturing run or until all possibilities have been exhausted.

When this process is used for successive garment manufacturing runs, the net result is that the defined color space inventory points are continually taken from ellipsoids containing the outer-most color space populations of the current inventory. This outside-towards-inside selection process (contrary to the prior art sorting techniques) tends to consolidate the remaining inventory so as to leave fabric rolls having color parameter values situated nearest the desired center of the color space of acceptable color parameter values. Advantages such as the following result:

1. Since the selection process causes the inventory to become more and more homogeneous, the possibility that a manufacturer is left with only an insufficiently homogeneous lot for a given garment manufacturing run is greatly reduced.

2. Since the overall available inventory is more thoroughly utilized, fabric rolls having defined color parameter values near the border of acceptable color space do not remain in inventory for unduly long periods.

3. Since the selection process results in more efficient use of an existing inventory, the necessary amount of fabric held in that inventory can be reduced, thereby reducing interest charges, warehouse expense and the like.

The data base of existing inventory is, of course, adapted as in conventional computer-managed systems to receive input data defining received rolls of fabric, fabric width (which may also be used as a fourth selection criterion making a four dimensional selection space, if required), to generate suitable inventory reports, pick lists for warehousemen, etc. The computer programmed for implementing the exemplary embodiment of this invention was written using a dBase III data base management software package run on an IBM PC AT Personal Computer.

These, as well as other advantages and objects of this inventions will be more completely understood and appreciated by careful reading of the following detailed description of the presently preferred exemplary embodiment of this invention, taken in conjunction with the accompanying drawings, of which:

Figure 1:
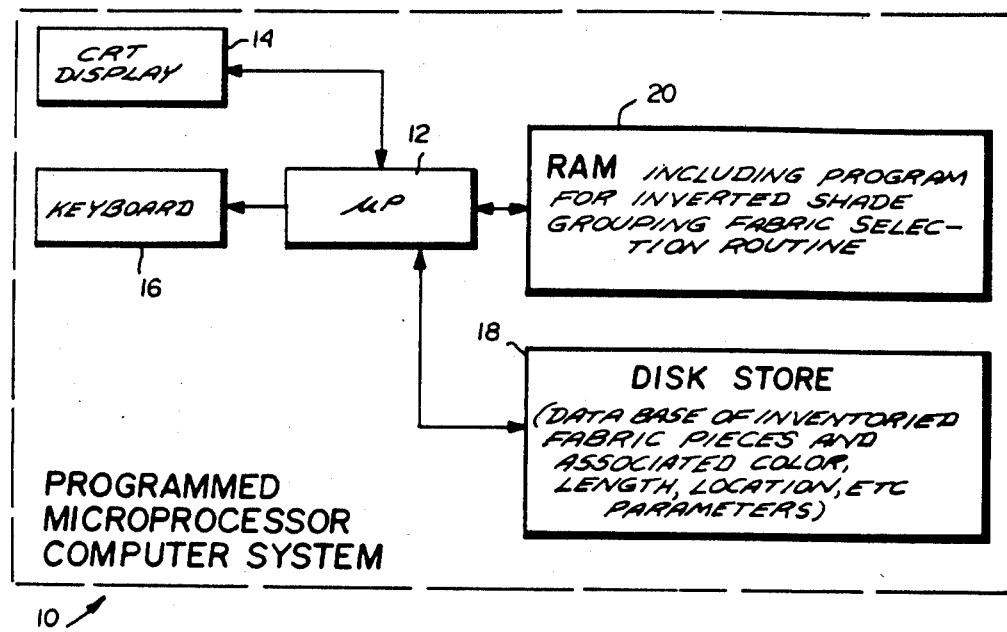
FIG. 1 is a generalized block diagram of a programmed microprocessor computer system suitable for implementing the exemplary embodiment for this invention.

FIG. 1 provides a block diagram of a typical microprocessor computer system 10 programmed in accordance with this invention. In the exemplary embodiment, the system 10 includes as "hardware" an IBM PC AT personal computer and, as "software", a commercially available dBase III data base management software package suitably user-programmed in accordance with this invention.

Typically, such a computer system 10 includes a microprocessor 12 having human interfaces via a visual crt display 14 and a manually activated keyboard 16. A disk store 18 conventionally includes a data base of inventoried fabric pieces and associated color, length, location, etc. parameters which can be readily machine accessed by the microprocessor 12 under suitable program control. A randomly accessible memory 20 is typically also included for program storage (at least during program execution time). In this invention, the stored program within RAM 20 will include a program for an inverted shade grouping fabric selection routine in accordance with this invention. It will be appreciated that the portions of such RAM which store program segments directed toward accomplishment of a particular function will necessarily constitute a portion of the provided apparatus or "means" for achieving that same respective function in this exemplary embodiment.

In the exemplary embodiment, the computer system 10 is caused to include a data base which has data for each inventory entry identifying the length of a given fabric roll, its width, its dL*, da* and db* color values (i.e. in terms of deviation from a nominal specified standard value), the location of a given fabric roll (if more than one location is possible within inventory), the date upon which the fabric roll was added to the inventory, an identification of the bill of lading associated with the acquisition of each fabric roll, and error value E representing the total deviation from nominal specified color parameter values (e.g. the square root of the sum of the squares of the three major color parameter values) and the number of times that particular fabric roll has been recycled as well as any other additional data which may be desired. It will be appreciated that the color parameter values of dL*, da* and db* may be measured and recorded in any desired units of measurement (including normalized values) so long as consistent usage of units is maintained throughout the process.

Figure 2:
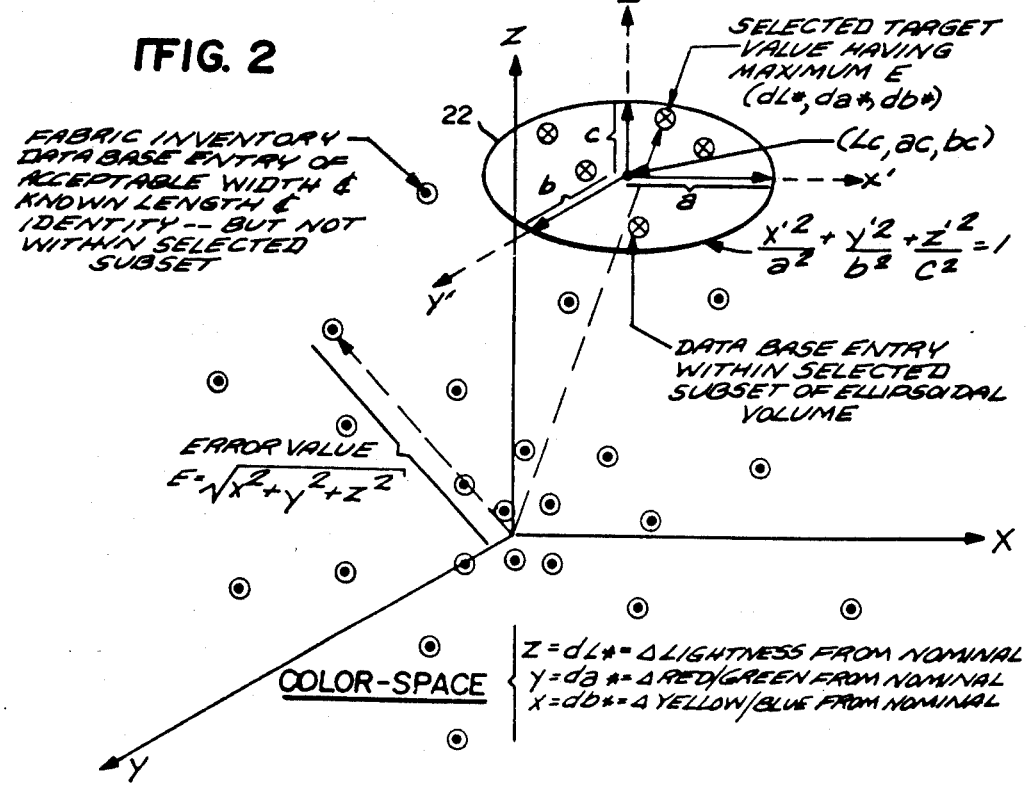
FIG. 2 is a schematic depiction of color space useful in explaining and understanding the exemplary embodiment of this invention.

FIG. 2 depicts three dimensional x,y,z color space where the origin represents nominal expected or specified lightness, red/green and yellow/blue values. Accordingly, the x,y,z values in the color space of FIG. 2 represent the delta or deviation of these color parameters from such nominal values. Each fabric roll currently in inventory will thus define some predetermined point within the color space of FIG. 2 as has been there depicted within small circles. As will be appreciated, if each of the three color space dimensions for fabric pieces accessioned to the inventory is permitted to vary by predetermined plus/minus amounts, all such defined points in color space will fall necessarily within a parallelepiped volume (not depicted in FIG. 2). Each such defined point will also have a predetermined error value E equal to its distance from the origin in color space as also depicted in FIG. 2.

In accordance with the exemplary embodiment of this invention, the defined point in color space having a maximum E value will be selected as a target value having x,y,z coordinates equal to particular values for dL*, da*, db* respectively. An elipsoidal volume 22 is then defined in color space by having its outer surface pass through or just outside the selected target value point (i.e. the ellipsoidal volume encompasses the target point) and by having the a,b,c axes of the ellipsoidal volume equal to the acceptable variation in dL*, da*, db* color parameter values for fabric pieces to be used commonly in the construction of a given garment run.

As depicted in FIG. 2, the ellipsoidal volume 22 may be thought of as being constructed at translated x',y',z' coordinates having an origin sufficiently displaced from the selected target value and having the usual ellipsoidal equation with respect to such a displaced x', y', z' coordinate system. The defined inventoried points in color space which happen to fall within ellipsoidal volume 22 are denoted by an encircled "x" in FIG. 2.

Once this subset of defined inventory points have been located and identified, the associated cumulative length of available fabric within the subset may readily be determined (e.g. by addition of appropriate data base fields) and compared to the length of fabric needed for the garment manufacturing run at issue. It should also be understood that the defined inventory points in the color space of FIG. 2 may have been preselected so as to include only those points corresponding to fabric rolls having acceptable minimum fabric width, length, etc.

If the first selected subset within ellipsoidal volume 22 has sufficient yardage, then a report may be generated identifying the corresponding fabric rolls and inventory so that they may be pulled and used in the desired garment manufacturing run and so that the existing inventory data base may be updated to remove these fabric roll entries from the current inventory.

On the other hand, if the subset selected within the first defined ellipsoid 22 does not contain sufficient yardage for the desired manufacturing run, then a next selected target is chosen. The next target, may, for example, have the second highest error value E. As should be appreciated, other criteria for selecting a target value may be utilized in accordance with this invention so long as the target values are selected at or near the outside of the acceptable color space and only subsequently moved inwardly as may be necessary to locate a sufficient quantity of sufficiently color matched fabric for a desired garment manufacturing run. It should now be appreciated that the process already explained with respect to FIG. 2 is iteratively executed for successive selected target values which start at or near the outside of acceptable color space and are successively moved inward towards the origin as necessary to locate an ellipsoidal volume 22 which happens to be disposed at a maximum distance from the origin of color space—but yet including enough defined inventory points to provide sufficient cumulative fabric length for the desired garment manufacturing run.

The process depicted in FIG. 2 thus provides a shade grouping algorithm which selects pieces of fabric from inventory which are close enough in color (where "close enough" is defined by user supplied tolerances) to be cut and sewn together. Each piece in inventory has a corresponding set of x,y,z delta values. The three x,y,z delta values, known as dL*, da*, and db*, are the distances in CIELab color space from the nominal color standard values to the measured values for each inventoried piece for each of the three color dimensions. The delta values may be obtained by scanning a sample of the fabric with a color measuring instrument and computing its distance from the nominal specified color standard.

When a newly inventoried piece is loaded into the data base, its total distance from the nominal color standard is calculated by computing the square root of the sum of the squares of the three delta values. This total distance is also known as dE. The inventoried piece with the largest dE value is the piece which is the most far away from the nominal color standard. This piece will be the first target piece used as a basis for a shade group in the exemplary embodiment. An imaginary ellipsoid is then drawn around the piece's (dL*, da*, db*) triplet. All points which are encompassed by the ellipsoid are considered to be part of that shade group. The axis dimension of each of the three dimensions of the ellipsoid is determined by tolerances specified by the user. Each dimension may have a unique tolerance. The initial point selected is, in the exemplary embodiment, not used as the center of the imaginary ellipsoid. Rather, the preferred center point in the exemplary embodiment is at (Lc, ac, bc) where:

$$Lc = dL* - ((dL*/(|dL*| + |da*| + |db*|)) \times (L\text{-}*tol/1.5)) \quad \text{[Eq. 1]}$$

$$ac = da^* - ((da^*/(|dL^*| + |da^*| + |db^*|)) \times (a^* - tol/1.5)) \quad [\text{Eq. 2}]$$

$$bc = db^* - ((db^*/(|dL^*| + |da^*| + |db^*|)) \times (b^* - tol/1.5)) \quad [\text{Eq. 3}]$$

given that

|x| is defined to be the absolute value of x and
L*tol is the tolerance for the dL** color dimension and
a*tol is the tolerance for the da* color dimension and
b*tol is the tolerance for the db* color dimension.

Each piece in inventory is checked to see if its delta value triplet is contained by the imaginary ellipsoid formed by (Lc,ac,bc) and L*tol, a*tol, and b*tol. This check is accomplished by computing:

$$\frac{(dL^* - LC)^2}{(L^*tol)^2} + \frac{(da^* - ac)^2}{(a^*tol)^2} + \frac{(db^* - bc)^2}{(b^*tol)^2} \quad [\text{Eq. 4}]$$

for each (dL*,da*,db*) triplet.

If the result of the Equation 4 computation is less than or equal to one for a given (dL*,da*,db*) triplet, the triplet is contained in the ellipsoid and its corresponding piece is included in the shade group.

Figure 3:
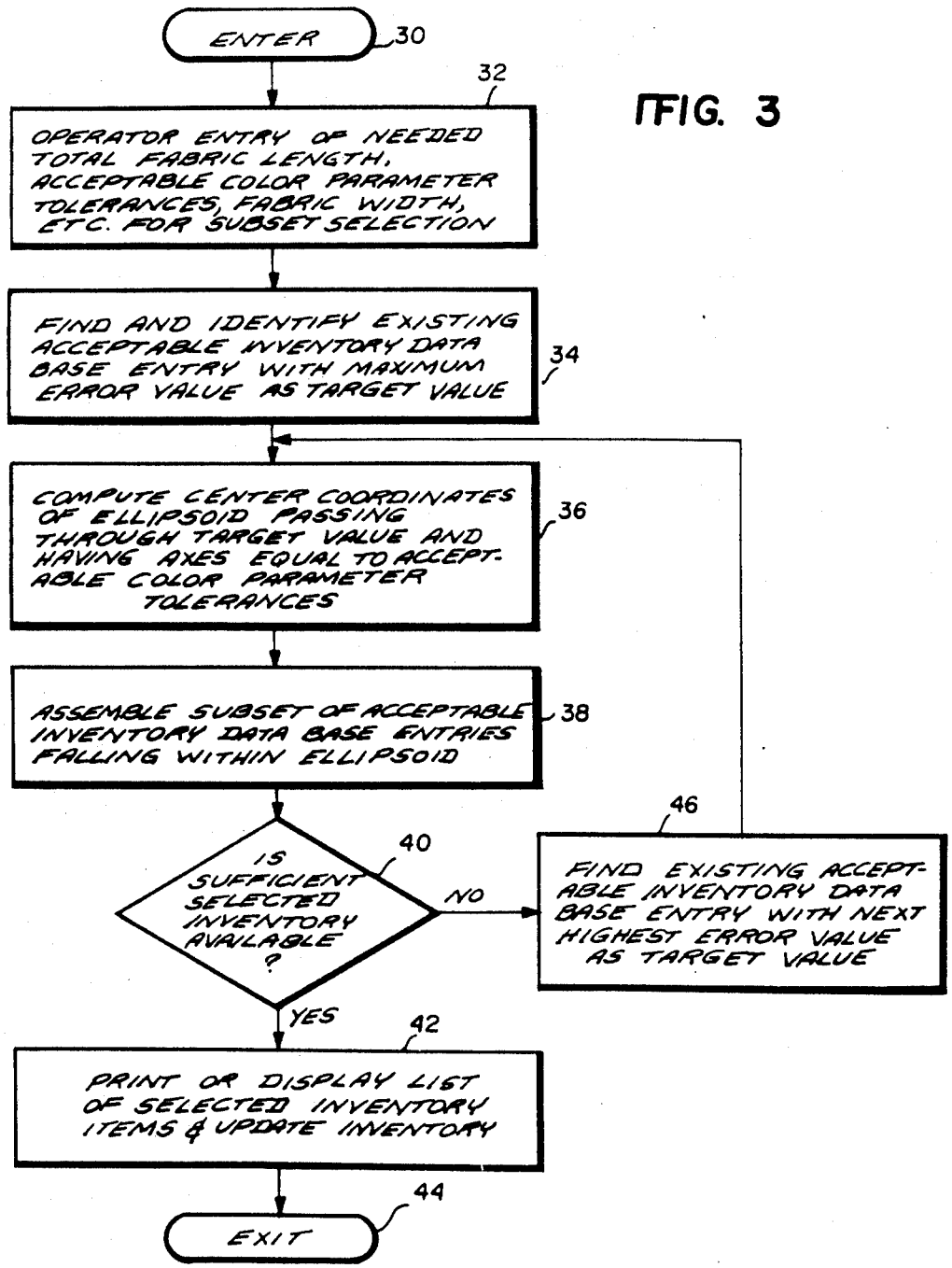
FIG. 3 is a simplified flow chart of an exemplary computer program which may be utilized for implementing the exemplary fabric inventory selection process of this invention.

The flow chart of FIG. 3 depicts an exemplary computer program for implementing the exemplary embodiment. For example, upon entry at block 30 into the shade grouping selection routine of this invention, an opportunity is provided at block 32 for the operator to enter the total length of needed fabric, acceptable color parameter tolerances, fabric widths, minimum roll length, etc. required for subset selection for a desired garment manufacturing run. Alternatively, such user supplied parameters may be input before the subroutine of FIG. 3 is entered. They may also be entered remotely via suitable modem data transmission links or the like, as should be apparent.

As a result, there will be a defined color space as depicted in FIG. 2 where potentially acceptable fabric rolls and inventory are represented by predefined points, etc. Within such a color space data base, the entry having a maximum error value E is identified at step 34. Thereafter, using the above-stated Equations 1-3, the center coordinates of an ellipsoidal volume passing through or near (e.g. just "outside") the selected target point and having axes equal to acceptable color parameter tolerances (earlier input at step 32) is accomplished at step 36. Following that, using above stated Equation 4, a subset of acceptable inventory data base entries falling within such an ellipsoidal volume is selected at step 38.

The cumulative fabric length within such a selected subset is then tested for sufficiency at step 40 (e.g. using the input criteria of step 32). If sufficient fabric length is available within the assembled subset, then a suitable list of selected inventory items is printed or displayed at step 42 and the current inventory is appropriately updated before exit at 44 to other data base management routines. On the other hand, if insufficient fabric length is available within the first assembled subset, then a new target value (e.g., the defined point within color space having the next highest E value) is identified at step 46 and program control is then looped back to repeat steps 36, 38 and 40 thereby assembling a further subset within a further ellipsoidal volume etc. The process is repeated iteratively until there are no further new target values to choose, whereupon step 46 may include a decision point to exit with an appropriate message to the operator.

While only one exemplary embodiment of the invention has been described in detail, those skilled in the art will recognize that there may be many modifications and variations made in this exemplary embodiment while yet retaining many of the novel features and advantages of this invention. Accordingly, all such variations and modifications are intended to be included within the scope of the following claims.

What is claimed is:

1. A method for selecting, from an inventory, a subset of colored fabric pieces which may be used together, each potentially acceptable fabric piece in inventory having plural color parameters associated therewith which deviate to varying degrees from predetermined nominal values, said method comprising the steps of:

defining a sub-volume of predetermined shape and size corresponding to acceptable deviations for such parameters within a defined color space in which all values of said color parameters reside;

moving said sub-volume to different locations of said sub-volume within said color space to encompass color parameter values associated with corresponding subsets of said fabric pieces, which encompassed values substantially deviate from the corresponding nominal values located at the center of said color space but which encompassed values are nevertheless sufficiently close to each other as to be commonly usable; and recording the identity of the fabric pieces having said encompassed color parameter values for the one location of said sub-volume as a selected subset.

2. A method as in claim 1 wherein, unless said selected subset of fabric pieces cumulatively provide a predetermined minimum length of fabric, the step of moving said sub-volume is repeated so as to move the sub-volume to a different position in color space until said selected subset of fabric pieces do cumulatively provide said predetermined minimum length.

3. A method for selecting, from an inventory, a subset of colored fabric pieces which may be used together, each potentially acceptable fabric piece in inventory having plural color parameter values associated therewith which deviate to varying degrees from predetermined nominal values at the center of a defined color space, said method comprising the steps of:

positioning a predetermined sub-volume at successive locations of said sub-volume in color space where the center of the sub-volume substantially deviates from the center of the color space and where the size of the sub-volume corresponds to acceptable deviations for such parameters; and identifying those fabric pieces having associated color parameter values which fall substantially within said positioned sub-volume at a given location thereof as a subset fabric pieces having color parameter values sufficiently close to each other as to be commonly usable.

4. A method as in claim 3 wherein said positioning and identifying steps are repeated, if necessary, until at least one selected subset of fabric pieces cumulatively provide a predetermined minimum length of fabric.

5. Apparatus for selecting, from an inventory, a subset of colored fabric pieces which may be used together, each potentially acceptable fabric piece in inventory having plural color parameters associated therewith which deviate to varying degrees from predetermined nominal values, said apparatus comprising:

first means for defining a sub-volume of predetermined shape and size corresponding to acceptable deviations for each parameter within a defined color space in which all values of said color parameters reside;

second means operatively connected with said first means, for moving said sub-volume to different locations of said sub-volume within said color space to encompass color parameter values associated with corresponding subsets of said fabric pieces, which encompassed values substantially deviate from the corresponding nominal values located at the center of said color space but which encompassed values are nevertheless sufficiently close to each other as to be commonly usable; and third means, operatively connected with said first and second means, for recording the identity of the fabric pieces having said encompassed color parameter values for the one location of said sub-volume as a selected subset.

6. Apparatus as in claim 5 wherein said second means includes means for moving the sub-volume to different position in color space until said selected subset of fabric pieces do cumulatively provide said predetermined minimum length unless said selected subset of fabric pieces cumulatively provide a predetermined minimum length of fabric.

7. Apparatus for selecting, from an inventory, a subset of colored fabric pieces which may be used together, each potentially acceptable fabric piece in inventory having plural color parameter values associated therewith which deviate to varying degrees from predetermined nominal values at the center of a defined color space, said apparatus comprising:

first means for positioning a predetermined sub-volume at successive locations of said sub-volume in color space where the center of the sub-volume substantially deviates from the center of the color space and where the size of the sub-volume corresponds to acceptable deviations for such parameters; and second means, operatively connected with said first means, for identifying those fabric pieces having associated color parameter values which fall substantially within said positioned sub-volume at a given location thereof as a subset fabric pieces having color parameter values sufficiently close to each other as to be commonly usable.

8. Apparatus as in claim 7 wherein said first means and second means are operatively connected with third means for repeatedly positioning and identifying, if necessary, until at least one selected subset of fabric piece cumulatively provide a predetermined minimum length of fabric.

* * * * *